US006933622B2

United States Patent
Foesel et al.

(10) Patent No.: US 6,933,622 B2
(45) Date of Patent: Aug. 23, 2005

(54) DIESEL-ELECTRIC LOCOMOTIVE AND TRACTION GROUPING COMPOSED OF AT LEAST TWO DIESEL-ELECTRIC LOCOMOTIVES

(75) Inventors: Ulrich Foesel, Erlangen (DE); Christian Gritsch, Nuremberg (DE); Heinz Hofmann, Kunreuth (DE); Gyoergy Papp, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 82 days.

(21) Appl. No.: 10/410,150

(22) Filed: Apr. 10, 2003

(65) Prior Publication Data

US 2004/0150231 A1 Aug. 5, 2004

(30) Foreign Application Priority Data

Jan. 30, 2003 (DE) .......................... 103 03 715

(51) Int. Cl.[7] ............................... H02K 7/20
(52) U.S. Cl. ................................ 290/8; 290/9
(58) Field of Search ................. 290/4 R, 4 A, 290/9, 3, 8; 105/35

(56) References Cited

U.S. PATENT DOCUMENTS

| 1,418,977 A | * | 6/1922 | Schon ........................ 290/10 |
| 6,066,897 A | * | 5/2000 | Nakamura .................. 290/4 A |
| 6,591,758 B2 | * | 7/2003 | Kumar ........................ 105/35 |

FOREIGN PATENT DOCUMENTS

| DE | 197 44 866 C1 | 7/1999 |
| GB | 301339 | 11/1928 |

* cited by examiner

*Primary Examiner*—Darren Schuberg
*Assistant Examiner*—Leda Pham
(74) *Attorney, Agent, or Firm*—Harness, Dickey & Pierce, P.L.C.

(57) ABSTRACT

A diesel-electric locomotive includes an assembly including a diesel engine and a generator, a drive unit and a control device, connectable to control devices of other locomotives. Further, a traction grouping includes at least two such diesel-electric locomotives, the locomotives being connected to one another by a control connection. There is provision for a power line to be present with terminals for power lines of other locomotives. In the traction grouping, the locomotives are connected to one another by a power line.

4 Claims, 1 Drawing Sheet

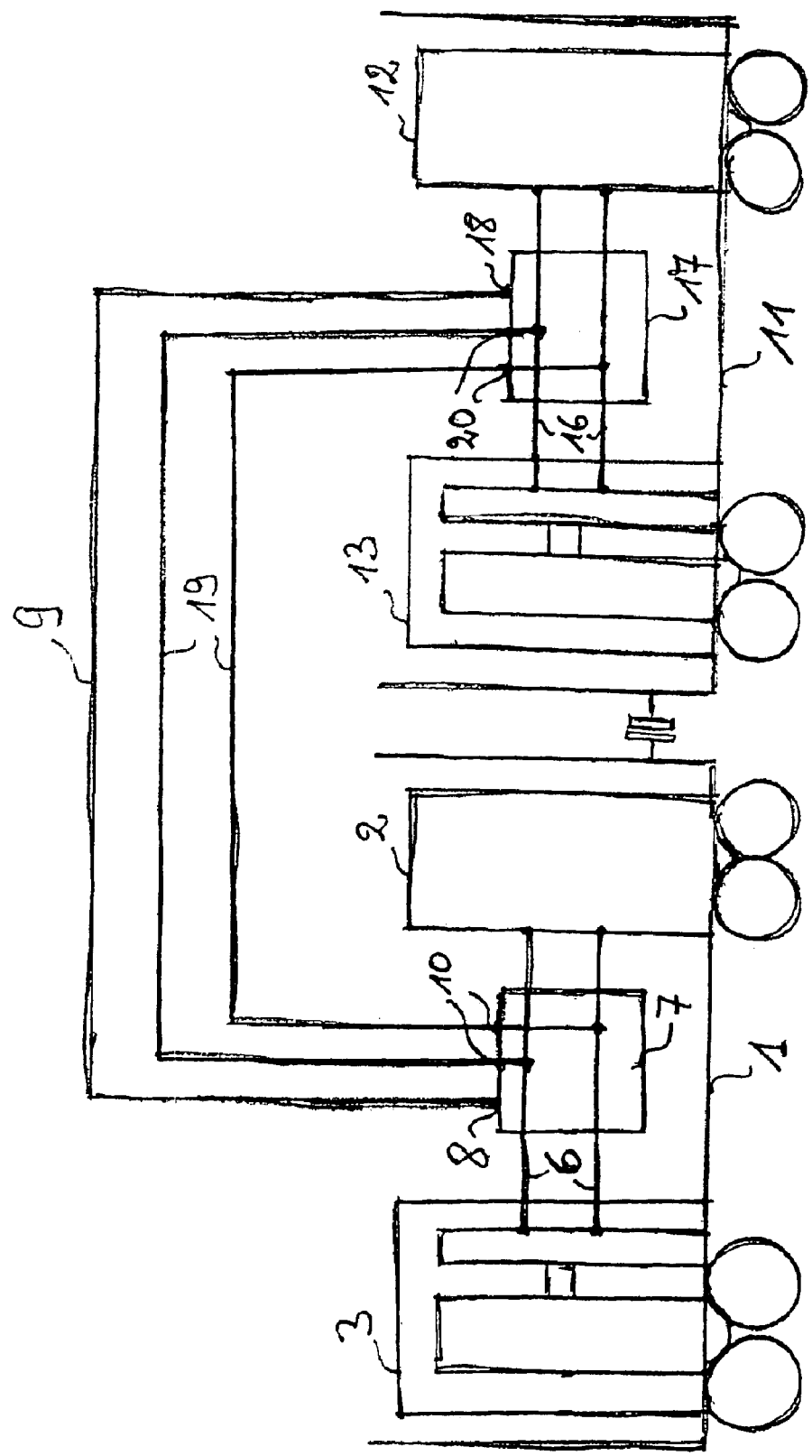

US 6,933,622 B2

DIESEL-ELECTRIC LOCOMOTIVE AND TRACTION GROUPING COMPOSED OF AT LEAST TWO DIESEL-ELECTRIC LOCOMOTIVES

The present application hereby claims priority under 35 U.S.C. §119 on German patent application number DE 10303715.2 filed Jan. 30, 2003, the entire contents of which are hereby incorporated herein by reference.

FIELD OF THE INVENTION

The invention generally relates to a diesel-electric locomotive having an assembly. Preferably, the assembly includes a diesel engine and a generator, with a drive unit and with a control device which can be connected to control devices of other locomotives.

The invention also generally relates to a traction grouping composed of at least two diesel-electric locomotives. Preferably, each includes an assembly including a diesel engine and a generator, and each with a drive unit. The locomotives are further preferably connected to one another by a control connection.

BACKGROUND OF THE INVENTION

A diesel-electric locomotive is not sufficient for pulling very heavy trains, in particular long goods trains. It is necessary to use two or even more such locomotives for a train. These locomotives then form a traction grouping.

Hitherto, apart from the mechanical coupling which was of course necessary, it was customary simply to connect the locomotives to one another by a control line. This control line had the purpose of controlling the additionally coupled locomotives from the driver's cab of the first locomotive. Only one locomotive driver was therefore needed.

If there was no defect in one of the locomotives, hitherto all of the locomotives of the traction grouping were operated with the same power which was predefined by the locomotive driver. If a defect occurred on a locomotive, the traction grouping immediately lost power.

SUMMARY OF THE INVENTION

An embodiment of the invention is based on an object of specifying a diesel-electric locomotive for a traction grouping, or such a traction grouping, in which the drive power can be optimized with respect to the nature of the section of the route, for example positive gradient or negative gradient, but also in terms of possible defects.

An object of specifying a suitable diesel-electric locomotive may be achieved according to an embodiment of the invention in that a power line is present with terminals for the power lines of other locomotives.

An object of specifying a suitable traction grouping may be achieved according to an embodiment of the invention in that the locomotives of the traction grouping are also connected to one another by way of a power line.

DETAILED DESCRIPTION OF THE PREFERRED EMBODIMENTS

The control connection 8, 9, 18 or the control device 7 from which the control connection 9 starts and the power line 6 are, for example, connected to the assembly and to the drive unit 2 in the locomotive 1 or in each locomotive 1, 11 of the traction grouping. Using the control connection and the power line 6, 16 provides the advantage that the locomotives of a traction grouping can each be operated independently. This is advantageous in particular if, for example, a device in a locomotive (e.g., 11) happens to be defective.

If, for example, the assembly failed in one of the locomotives 11 in a traction grouping (FIG. 1) composed of diesel-electric locomotives 1, 11, hitherto this locomotive 11 could not provide power any more. However, in a traction grouping according to an embodiment of the invention, the drive unit 12 of this locomotive 11 can be supplied with electrical power by the assemblies of at least one other locomotive 1 by use of the power lines 19. This leads to a situation in which all the locomotives 1, 11 can continue to be used to pull the train. Although the power drops in comparison with a defect-free traction grouping, higher tractive force is obtained, in particular on mountainous sections of routes, in comparison to that tractive force which would be available given a total failure of a locomotive.

It is also possible for the power of at least one of the other locomotives to be increased after a partial reduction in power of one locomotive of the traction grouping so that overall the same power as before is available. For this purpose. electrical power can be fed from the assembly of a locomotive 11 whose drive unit 12 is defective into the drive units of other locomotives (not shown) of the traction grouping by way of the power lines.

It is also advantageous if there is no defect present. In a section of a route with a positive gradient it is in fact customary to conduct approximately 40% of the power to the front bogie and approximately 60% of the power to the rear bogie. Hitherto, this configuration has not been changed even if, for example, three locomotives were coupled one behind the other in the traction grouping. The power line and the control connection which connect the locomotives to one another now provide the advantage that the power or tractive force which increases from the front toward the rear is possible for the driven bogies of the locomotives which are coupled one behind the other.

If there are three locomotives coupled one behind the other, it would be possible for the traction engines of the front bogie of the first locomotive to take up 38% and those of the rear bogie to take up 43% of the power/tractive force of a locomotive, while at the second locomotive there is 48% available at the front, 53% available at the rear and finally at the third locomotive there is 58% available at the front and 60% available at the rear. The additional power required in the second, and in particular in the third locomotives, is provided by the assembly of the first locomotive and is fed to the two other locomotives or their drive units by means of the power lines. The control is carried out, for example, from the driver's cab by means of the control connections. With this distribution of the drive power among the three locomotives an improved tractive force is obtained in particular on mountainous sections of routes.

Even when traveling through tunnels, it is appropriate to distribute the drive power/tractive force among the locomotives of the traction grouping. As a result of the high temperatures in the tunnel, caused in particular by the assemblies of the diesel-electric locomotives themselves, the rear locomotives supply less power than those at the front. On the other hand, the rear locomotives have a cleaner rail than the front locomotives as the front locomotives have already cleaned the rail. With a traction grouping according to an embodiment of the invention it is possible to advantageously feed part of the drive power generated in the front locomotives to the traction engines of the rear locomotives in order, in this way, to achieve a better distribution of the existing drive power with respect to the state of the rails.

Finally, in a traction grouping according to an embodiment of the invention it is also possible to distribute the drive power among the locomotives of the traction grouping differently when traveling downhill and in other cases. If only a very low drive power is required, it would be possible, for example, to use only the first locomotive, or only the first two locomotives. This provides the advantage of a saving in fuel.

When traveling downhill, which requires braking, it is appropriate to allow the power of the locomotives of the traction grouping to rise from the front to the rear.

In a diesel-electric locomotive 1, 11 there is, for example, an auxiliary operational supply unit 3, 13 which is connected to terminals 20, 10 for auxiliary power lines of other locomotives using an auxiliary power line 19. Correspondingly, auxiliary operational supply units 3, 13 of the locomotives 1, 11 are connected to one another in a traction grouping by use of auxiliary power lines 19.

Of course, for example, the control device 7, 17 of a locomotive or the control connection 8, 9, 18 of the locomotives of the traction grouping are also connected to the auxiliary operational supply units 3, 13.

This provides the advantage that, as in the case of the assemblies and the drive units 2, 12 of the locomotives 1, 11 of a traction grouping, the auxiliary operational supply units 3, 13 which are also possibly present are connected to one another in order to exchange electrical power.

A diesel-electric locomotive or a traction grouping composed of such locomotives according to an embodiment of the invention provides in particular the advantage that a traction grouping can be operated more effectively than hitherto. This applies both to possible defects in a locomotive of the traction grouping and to traveling on certain sections of routes, for example sections of routes with a positive gradient, sections of routes with a negative gradient or sections of routes through tunnels.

The control connections 8, 9, 18 start from the driver's cabs of the locomotives so that the individual locomotives, in particular the assemblies and the drive units, can be driven by the driver of the locomotive or by the primary locomotive controller. The desired power distribution between the locomotives is achieved by the power lines. Automatic driving by way of a control unit 7, 17 which is connected to sensors is also possible. In a traction grouping, the driving can optionally be carried out from one of the locomotives. The control connections may be control lines or radio links. The control device 7 of a locomotive 1 can then be connected to the control device 17 of another locomotive 11 by way of a control line or by a radio link (remote control by radio).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A diesel-electric locomotive, comprising:

a control device, connectable to control devices of at least one other locomotive; and a supply unit, including a diesel engine and a generator, connected to a drive unit via energy supply lines and connectable to another drive unit of the at least one other locomotive; wherein the control device is allocated to the energy-supply lines for distributing power from the supply unit to the drive units in order to vary operation of the drive units.

2. The diesel-electric locomotive as claimed in claim 1, further comprising:

an auxiliary supply unit connected to a consumer, via auxiliary energy supply lines, and connectable to a consumer of the at least one other locomotive; and wherein the control device is allocated to the auxiliary energy supply lines for distributing the power from the auxiliary supply unit to the connected consumers.

3. A traction system for at least two diesel electric locomotives, comprising:

control devices, associated with each of the at least two locomotives, connected to each other; and supply units associated with each of the at least two locomotives, wherein the supply units include a diesel motor and a generator, and are connected to drive units of the at least two locomotives via energy-supply lines; wherein the control devices of each of the at least two locomotives are allocated to energy-supply lines for distributing the power from the supply units to the drive units for varying operation of the drive units.

4. The traction grouping as claimed in claim 3, further comprising:

auxiliary supply units, provided in the at least two locomotives, which are connected to the consumers in the at least two locomotives via auxiliary energy-supply lines, and wherein the control devices of the at least two locomotives are allocated to the auxiliary energy lines of the at least two locomotives for distributing the power from the auxiliary supply lines to the consumers.

* * * * *